US010200363B2

(12) United States Patent
Gichana et al.

(10) Patent No.: US 10,200,363 B2
(45) Date of Patent: Feb. 5, 2019

(54) METHOD AND APPARATUS FOR PROVIDING IDENTIFICATION BASED ON A MULTIMEDIA SIGNATURE

(75) Inventors: Brian Omwenga Gichana, Nairobi (KE); Pauline Githinji, Nairobi (KE); Jussi Markus Impiö, Nairobi (KE); Marko Mikael Myllyluoma, Oulu (FI); Moses Sitati, Nairobi (KE)

(73) Assignee: Nokia Technologies Oy, Espoo (FI)

( * ) Notice: Subject to any disclaimer, the term of this patent is extended or adjusted under 35 U.S.C. 154(b) by 1461 days.

(21) Appl. No.: 13/271,631

(22) Filed: Oct. 12, 2011

(65) Prior Publication Data

US 2013/0097303 A1    Apr. 18, 2013

(51) Int. Cl.
G06F 17/30    (2006.01)
H04L 29/06    (2006.01)
H04M 3/436    (2006.01)
H04W 12/06    (2009.01)

(52) U.S. Cl.
CPC ........ H04L 63/0861 (2013.01); H04M 3/436 (2013.01); H04W 12/06 (2013.01); H04M 2203/6045 (2013.01)

(58) Field of Classification Search
CPC .................................................. G06Q 10/107
See application file for complete search history.

(56) References Cited

U.S. PATENT DOCUMENTS

| 5,369,699 | A * | 11/1994 | Page | A61B 5/0531 |
| | | | | 379/114.05 |
| 8,498,946 | B1 * | 7/2013 | Parekh | G06Q 10/107 |
| | | | | 455/414.3 |
| 8,589,487 | B1 * | 11/2013 | Reeves | H04M 3/567 |
| | | | | 709/203 |
| 2003/0032414 | A1 * | 2/2003 | Melaku | H04M 1/576 |
| | | | | 455/415 |
| 2004/0240631 | A1 * | 12/2004 | Broman | G06Q 20/341 |
| | | | | 379/88.02 |
| 2006/0095941 | A1 | 5/2006 | Fidler et al. | |
| 2006/0149825 | A1 * | 7/2006 | Kim | 709/207 |
| 2006/0182245 | A1 | 8/2006 | Steinmetz | |
| 2007/0043758 | A1 | 2/2007 | Bodin et al. | |

(Continued)

OTHER PUBLICATIONS

International Search Report for related International Patent Application No. PCT/FI2012/050918 dated Dec. 28, 2012, pp. 1-4.

(Continued)

*Primary Examiner* — Tarek Chbouki

(74) *Attorney, Agent, or Firm* — Ditthavong & Steiner, P.C.

(57) ABSTRACT

An approach is provided for providing identification based on a multimedia signature. An indication platform processes and/or facilitates a processing of one or more device events to determine one or more participants, one or more participant devices, or a combination thereof. The indication platform further causes, at least in part, an association of one or more multimedia signatures with the one or more device events, the one or more participants, the one or more participant devices, or a combination thereof. The indication platform also determines to identify the one or more device events, the one or more participants, the one or more participant devices, or a combination thereof based, at least in part, on the association.

20 Claims, 14 Drawing Sheets

(56) References Cited

U.S. PATENT DOCUMENTS

| | | | |
|---|---|---|---|
| 2007/0201443 A1* | 8/2007 | Saha | H04L 12/66 370/356 |
| 2007/0263872 A1* | 11/2007 | Kirkup et al. | 380/273 |
| 2008/0215323 A1* | 9/2008 | Shaffer | H04M 3/5335 704/246 |
| 2009/0109961 A1* | 4/2009 | Garrison | H04L 12/66 370/352 |
| 2009/0170482 A1* | 7/2009 | Alessio | G06Q 10/08 455/414.1 |
| 2010/0192055 A1* | 7/2010 | Shaked | G06F 17/30616 715/234 |
| 2010/0316232 A1* | 12/2010 | Acero | H04R 27/00 381/92 |
| 2011/0003578 A1* | 1/2011 | Chen et al. | 455/404.1 |
| 2011/0054894 A1* | 3/2011 | Phillips et al. | 704/235 |
| 2012/0002002 A1* | 1/2012 | Shaffer | H04N 7/147 348/14.09 |
| 2013/0091227 A1* | 4/2013 | Bhakar | H04L 12/586 709/206 |

OTHER PUBLICATIONS

Written Opinion for related International Patent Application No. PCT/FI2012/050918 dated Dec. 28, 2012, pp. 1-8.

Automatic Record Voice Phone Call on Symbian3, s60v3, s60v5 | sPeEdYtOwN, http://www.speedytown.com/index.php/2011/02/07/automatic-record-voice-phone-call-on-symbian3-s60v3-s60v5, Accessed: Feb. 22, 2012, pp. 1-3.

Call Recorder | ApniApps.com, http://www.apniapps.com/?tag=call-recorder, Accessed: Feb. 22, 2012, pp. 1-11.

HTC Mobile Phone Support—HTC S743—General and Other, http://www.htc.com/us/support/htc-s743/help/general-and-other, Accessed: Feb. 22, 2012, pp. 1.

1Dffice Action for corresponding Indian Patent Application No. 4202/CHE/2012, dated Mar. 13, 2018, 6 pages.

* cited by examiner

METHOD AND APPARATUS FOR PROVIDING IDENTIFICATION BASED ON A MULTIMEDIA SIGNATURE

BACKGROUND

Service providers and device manufacturers (e.g., wireless, cellular, etc.) are continually challenged to deliver value and convenience to consumers by, for example, providing compelling network services. Service providers and device manufacturers also are continually challenged to deliver value and convenience to consumers by, for example, providing modern devices that have increased functionality. However, with the increase in compelling network services and the increase in device functionality, some simple tasks may have been overlooked. Such simple tasks may include identifying participants or participant devices associated with one or more events that occur at a device. For example, identifying an unknown caller in a call log has not been simplified despite increases in services and device functionality. Such identification is exacerbated when the consumer associated with a device is disabled or illiterate, such that, for example, reading who a call is from is not possible. Therefore, service providers and device manufacturers face significant technical challenges in providing identification of events, participants, and/or participant devices associated with consumer devices.

SOME EXAMPLE EMBODIMENTS

Therefore, there is a need for an approach for providing identification based on a multimedia signature.

According to one embodiment, a method comprises processing and/or facilitating a processing of one or more device events to determine one or more participants, one or more participant devices, or a combination thereof. The method also comprises causing, at least in part, an association of one or more multimedia signatures with the one or more device events, the one or more participants, the one or more participant devices, or a combination thereof. The method further comprises determining to identify the one or more device events, the one or more participants, the one or more participant devices, or a combination thereof based, at least in part, on the association.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of one or more device events to determine one or more participants, one or more participant devices, or a combination thereof. The apparatus is also caused to cause, at least in part, an association of one or more multimedia signatures with the one or more device events, the one or more participants, the one or more participant devices, or a combination thereof. The apparatus is further caused to determine to identify the one or more device events, the one or more participants, the one or more participant devices, or a combination thereof based, at least in part, on the association.

According to another embodiment, a computer-readable storage medium carries one or more sequences of one or more instructions which, when executed by one or more processors, cause, at least in part, an apparatus to process and/or facilitate a processing of one or more device events to determine one or more participants, one or more participant devices, or a combination thereof. The apparatus is also caused to cause, at least in part, an association of one or more multimedia signatures with the one or more device events, the one or more participants, the one or more participant devices, or a combination thereof. The apparatus is further caused to determine to identify the one or more device events, the one or more participants, the one or more participant devices, or a combination thereof based, at least in part, on the association.

According to another embodiment, an apparatus comprises means for processing and/or facilitating a processing of one or more device events to determine one or more participants, one or more participant devices, or a combination thereof. The apparatus also comprises means for causing, at least in part, an association of one or more multimedia signatures with the one or more device events, the one or more participants, the one or more participant devices, or a combination thereof. The apparatus further comprises means for determining to identify the one or more device events, the one or more participants, the one or more participant devices, or a combination thereof based, at least in part, on the association.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing identification based on a multimedia signature are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
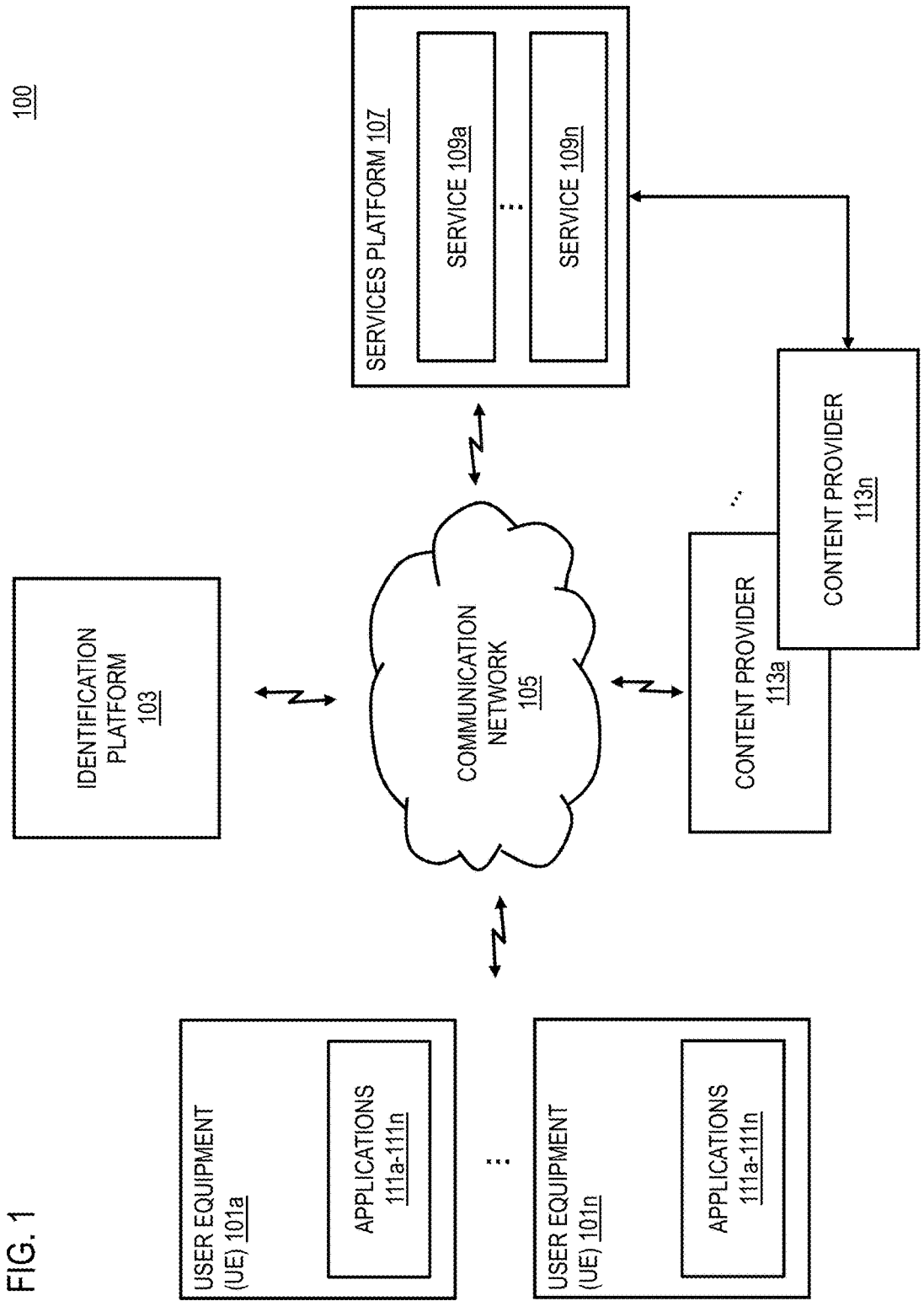
FIG. 1 is a diagram of a system capable of providing identification based on a multimedia signature, according to one embodiment.

FIG. 1 is a diagram of a system capable of providing identification based on a multimedia signature, according to one embodiment. As discussed above, with the increase in compelling network services and the increase in device functionality, some simple tasks may become more complex or may have been overlooked with regard to simplification. Such simple tasks may include identifying participants or participant devices associated with one or more events that occur at a device. For example, if a device receives a call from an unknown contact, many devices do not include a module or feature for identifying the unknown caller. Often, the user associated with the device has only the option of contacting an external service that can provide the identity of the unknown caller. This problem is especially apparent when the user has received several missed calls from several unknown numbers, or has received several voicemails while the device was off or out of the coverage area, but the voicemails do not specify a caller and/or a contact number. Thus, the user may only be able to differentiate the calls based on the call times and the durations recorded by the device. The inability to identify participants or participant devices associated with device events at a device is intensified when the user of the device is disabled. For example, a person that is partially blind may be unable to distinguish contacts in an address book or a contacts list associated with the device. Additionally, persons that are not disabled but are instead illiterate may have similar problems distinguishing contacts in an address book or a contacts list if they are unable to read the list. This problem is intensified when attempting to distinguish participants and/or participant devices associated with one or more device events that are more complicated than merely a list of contacts. For example, social networking services allow users to leave comments on user profile pages. Although the comments may be associated with a user name, particularly for profiles associated with disabled or illiterate users, the user may be unable to determine the user associated with the comment despite the comment being associated with a user name. Therefore, there is a need for an approach for providing identification based on a multimedia signature.

To address this problem, a system 100 of FIG. 1 introduces the capability to provide identification based on a multimedia signature. The system 100 may process one or more device events associated with a user's device to determine one or more participants, one or more participant devices, or a combination thereof associated with the device events. A device event may be any event associated with a user's device. Such events may include, for example, an audio call, a video call, an MMS message, an SMS message, an email, a comment on a social networking service, a calendar event, a task event, a detected user activity, and the like. The one or more participants may be, for example, callers associated with a telephone call, participants in a video call, the sender of an SMS or MMS message, a user name associated with the a comment on social networking service, and the like. The one or more participant devices may be any device that is associated with the one or more device events and/or the one or more participants associated with the device events.

Further, the system 100 may cause an association of one or more multimedia signatures with the one or more devices events, the one or more participants, the one or more participant devices, or the combination thereof. The multimedia signatures may constitute one or more unique signatures for identifying the one or more device events, the one or more participants, the one or more participant devices, or the combination thereof. The multimedia signatures may include one or more portions of audio, video, and/or text that are used to identify the particular device event, participant, or participant device. The system 100 may then determine to identify one or more of the device events, one or more of the participants, one or more of the participant devices, or a combination thereof based on the association.

By way of example, a device event may correspond to a telephone call between the user and a participant. The system 100 may determine the participant associated with the telephone call and associate a multimedia signature with the participant. The multimedia signature may have been created using snippets of previous or current communications with the participant to generate an audio recording that may be played back to identify the participant. Accordingly, the system 100 may identify the participant based on the association with the multimedia signature. For example, when the user navigates through a list of contacts and selects the participant, the system 100 may identify the participant by playing the audio recording. Further, if the user navigates through a call log that includes a log associated with the telephone call between the user and the participant (e.g., the associated device event), the system 100 may identify the telephone call in the log based on the audio recording.

As shown in FIG. 1, the system 100 comprises a user equipment (UE) 101a-101n (collectively referred to as UE 101) having connectivity to an identification platform 103 via a communication network 105. The UE 101 may include one or more applications 111a-111n (collectively referred to as applications 111) that may be executed by the UE 101. The applications may include, for example, a calendar application, a contacts application, a call log application, a navigation application, and the like. One or all of the applications 111 may be used to interface with the identification platform 103 to provide identifications based on multimedia signatures. In one embodiment, one of the applications 111 may interface with the identification platform 103 to provide identifications based on the multimedia signatures to the other of the applications 111.

The system 100 further comprises a services platform 107 that includes one or more services 109a-109n (collectively referred to as services 109). The services platform 107 may provide one or more of the services 109 to the UE 101 and the identification platform 103. The services 109 may include, for example, a social networking service, a content provision service, a video conferencing service, a multimedia processing service, and the like. The system 100 further comprises one or more content providers 113a-113n (collectively referred to as content providers 113). The content providers 113 may provide content to the UE 101, the identification platform 103, and/or the services 109 on the services platform 107. The content may include, for example, audio content, video content, image content, and the like.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, one or more of the device events may be one or more communication sessions. Such communication sessions may involve images, videos, text, audio, or a combination thereof. By way of example, such communication sessions may involve telephone communications, video conference communications, email communications, and the like. In response to the communication session, the identification platform 103 may cause a recording, a sampling, a parsing, or a combination thereof of at least a portion of the communication sessions associated with the device events to generate the multimedia signatures associated with the device events, the participants associated with the device events, and/or the participant devices associated with the device events. By way of example, for a telephone communication session, the multimedia signature may constitute an audio recording of at least a portion of the communication session. The multimedia signature may correspond to only the portion of the communication session that is associated with the participant talking during the communication. Thus, by associating the recording of the participant with the participant in, for example, a contacts list, the user of the device may identify the participant in the contacts list based on the multimedia signature (e.g., the audio recording of the participant playing), rather than the user having visually determine the participant in the list.

An initiation of the recording, the sampling, the parsing, or the combination thereof may be based on a monitoring against one or more trigger criteria. The trigger criteria may include a keyword recognition, temporal information, volume information, pitch information, or a combination thereof.

In one embodiment, the identification platform 103 may determine that the one or more device events, the one or more participants, the one or more participant devices, or a combination are unknown. By way of example, upon receiving a telephone call at the UE 101, the participant associated with the telephone call may be unknown. Accordingly, based on the multimedia signature, such as an audio recording associated with the telephone call, the unknown participant stored in a call log may be determined based on the multimedia signature identifying the participant by the participants own voice.

In one embodiment, the identification platform 103 causes a rendering of one or more user interfaces for presenting one or more device events, one or more participants, one or more participant devices, or a combination thereof based on the multimedia signatures. By way of example, the user interfaces may include communication log interfaces, personal information management user interfaces, or a combination thereof. The identification platform 103 also determines an input for selecting the device events, the participants, the participant devices, or a combination thereof. The identification platform 103 causes a presentation of the multimedia signatures associated with the selected device events, the selected participants, the selected participant devices, or the combination thereof.

In one embodiment, the identification platform 103 receives one or more multimedia signature from one or more participants, one or more participant devices, or a combination thereof and uses these multimedia signatures for identifying the one or more participants, the one or more participant devices, or the combination thereof. For example, the identification platform 103 may receive an MMS message from a participant that includes the multimedia signature that the participant created, for example, on their own device with their own device. Thus, in one embodiment, the identification platform 103 allows a participant to control the multimedia signature associated with the participant or participant device on another user's UE 101. In one embodiment, the multimedia signature created by a participant may be transmitted to another participant or participant device using Bluetooth, MMS, email, or other mode of transmission.

In one embodiment, the identification platform 103 may determine a number of multimedia signatures in the form of audio communications associated with a participant or a participant device. Based on the number of audio communications, the identification platform 103 may user the audio communications in combination with a text-to-speech synthesizer to speak device events associated with the participant or the participant device. By way of example, if a participant forwards a text message to a UE 101, the identification platform 103 may process the text message in combination with the audio communications associated with the participant and in association with a text-to-speech synthesizer to read the text message to the user of the UE 101 in the voice of the participant based on a parsing of the audio communications to determine the words within the audio communications. In one embodiment, where the text message, or other communication that is being processed into text-to-speech, includes words that are not found in the audio communications, the identification platform 103 may user generic or default text-to-speech synthesizers to effect the text-to-speech for the missing words.

In one embodiment, the identification platform 103 may generate more than one multimedia signature to identify a device event, a participant, and/or a participant device. Thus, the identification platform 103 may use various multimedia signatures to identify the device event, the participant, and/or the participant device based on, for example, the various application settings that are associated with providing a multimedia signature. For example, an audio multimedia signature may be provided in response to, for example, an identification associated with a call log, and a textual multimedia signature may be provided in response to, for example, an identification associated with a calendar reminder.

In one embodiment, the identification platform 103 generates a conversation signature in addition to a multimedia signature. The conversation signature may be used to identify, for example, the subject of one or more communication sessions associated with a participant and/or a participant device. The identification platform 103 may associate a time dimension with the conversation signature to support more than one conversation signature for each device event, participant, and/or participant device. By way of example, a single participant may be associated with multiple device events. For each of one of the device events, the multimedia platform 103 may generate a multimedia signature that identifies the participant, and may generate one or more conversation signatures that identify the subject matter of each one of the device events. Multiple conversation signatures may be grouped according to the subject (e.g., content) of the conversation. The conversation signature may be generated automatically by the identification platform 103, or may be generated based on input from a user for which the conversation signature is being created. By way of example, the identification platform 103 may use one or more algorithms to process device events to determine the subject of the device events to generate the conversation signature. By way of another example, the identification platform 103 may allow the user to crop snippets of audio and/or video communications, and edit textual communications, to generate the conversation signatures. The conversation signatures allow for the identification of the subject of device events, such as communication sessions, and may be used in combination with the multimedia signatures such that, for example, the participants of a communication session may be identified and the subject of the communication session may be identified.

By way of example, the UE 101, the identification platform 103, the services platform 107, and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
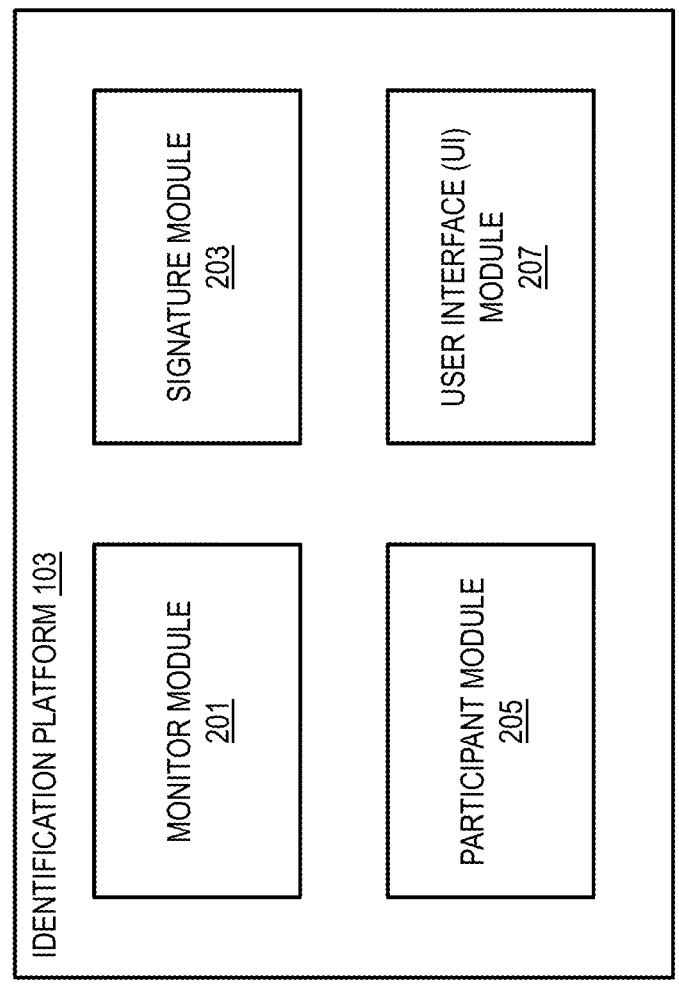
FIG. 2 is a diagram of the components of an identification platform, according to one embodiment.

FIG. 2 is a diagram of the components of an identification platform 103, according to one embodiment. By way of example, the identification platform 103 includes one or more components for providing identification based on a multimedia signature. It is contemplated that the functions of these components may be combined in one or more components or performed by other components of equivalent functionality. In this embodiment, the identification platform 103 includes a monitor module 201, a signature module 203, a participant module 205, and a user interface (UI) module 207.

The monitor module 201 causes a monitoring of one or more communication sessions against one or more trigger criteria. The monitor module 201 may continuously, periodically, or upon demand monitor for the trigger criteria. A user associated with a UE 101 that is being monitored by the monitor module 201 may select the one or more trigger criteria that are used in monitoring the communication sessions.

In one embodiment, the monitor module 201 may monitor for trigger criteria in the form of a specific keyword. The keyword may be determined by the identification platform 103 or the user associated with the UE 101 that is being monitored by the identification platform 103. The keyword may be spoken by the user of the UE 101, one or more participants associated with the communication sessions, or a combination thereof. By way of example, the keyword may be record that may be either spoken by the user of the UE 101, a participant of the communication sessions, or a combination thereof. Where one or more communication sessions involve text, the keyword may be in the form of a word or phrase that is contained in the text.

In one embodiment, the monitor module 201 may monitor for a trigger associated with temporal information. The temporal information may be for one or more set time periods. The temporal information may also include a set start time and a set stop time, in combination wither one or set time periods. By way of example, the temporal information criteria may correspond to starting immediately when a communication sessions being and least for a set period of time. The temporal information may also correspond to the time that the communication session is active.

In one embodiment, the monitor module 201 may monitor for trigger criteria in the form of volume and/or pitch information. The volume and/or pitch information may be based on one or more thresholds, such as when the volume and/or pitch of an audio communication are above a certain threshold, when the volume and/or pitch of an audio communication are below a certain threshold, or a combination thereof.

When the monitor module 201 determines that at least one trigger criteria is satisfied, the monitor module 201 initiates a recording, a sampling, a parsing, or a combination thereof of one or more communication sessions associated with one or more device events. The monitor module 201 monitors the one or more communications to determine when the satisfied criteria are no longer satisfied, or when different criteria are satisfied to stop the recording, the sampling, the parsing, or the combination thereof of one or more communication sessions.

In one embodiment, where the communication sessions are associated with a video call and/or an audio call, the monitor module 201 may trigger one or more indication in the form of an audio indication and/or visual indication of a recording or sampling of the communication sessions to comply with applicable law of the jurisdiction of the various participants involved in the communication sessions. In one embodiment, the monitor module 201 monitors the communications sessions for one or more multimedia signatures contained within the communications that may be generated by one of the participants and/or participant devices associated with the communication sessions. Thus, in one embodiment, the triggering of the criteria determines the portion of the communication sessions used in the recording, sampling, or parsing.

The signature module 203 causes a recording, a sampling, a parsing, or a combination thereof of at least a portion of the one or more communication sessions associated with the one or more device events in accordance with the monitor module 201. Where the communication sessions include audio, the signature module 203 may cause a recording or a sampling of the audio within the communications. Where the communication sessions include video, the signature module 203 may cause a recording or a sampling of the video within the communications. Where the communication sessions include textual communication, the signature module 203 may cause a parsing of the text within the communications.

After acquiring the recording, sampling, parsing, or the combination thereof, the signature module 203 may process the recording, sampling, and/or parsing to determine the various participants within recording, sampling, and/or parsing. In one embodiment, the signature module 203 processes one or more algorithms on the recording, sampling, and/or parsing to determine the various participants, for example, based on differences in audio, images, videos, or text. By way of example, the signature module 203 may determine the presence of two participants in an audio conversation based on the tones and pitch contained within the recording. The signature module 203 may further determine the presence of three participants in an textual conversation based on the presence of three user handles contained within the textual conversation. In one embodiment, the signature module 203 may accept input from the user of the UE 101 associated with the recording, sampling, and/or parsing to crop the recording, sampling, and/or parsing based on the participants within the communications. By way of example, a user may manually crop a recording of an audio communication to determine the various participants within the communication. After the recording, sampling, and/or parsing and the subsequent processing, the signature module 203 generates one or more signatures for the one or more participants in the communications.

In one embodiment, the signature module 203 also generates a conversation signature. The signature module 203 may analyze one or more device events, such as communication sessions, to determine the subject and/or content of the device event. The signature module 203 may then use the subject and/or content of the communication sessions to generate the conversation signature. The signature module 203 may generate one or more conversation signatures for each device event, participant, and participant device. The signature module 203 may associate a time dimension with the conversation signature to associate the conversation signature with a specific device event, such as a specific communication session. The signature module 203 may also group similar conversation signatures based on the subject and/or content of the conversation signature.

The participant module 205 processes devices events to determine the participants, the participant device, or the combination thereof associated with the device events. As discussed above, the device events may include, for example, at least in part, an audio call, a video call, a calendar event, a task event, a detected user activity, or a combination thereof. In one embodiment, the participants and/or participant devices associated with the device events may be determined based on an analysis of the multimedia signatures, where reference multimedia signatures are compared to newly created multimedia signatures based on a new device event. Based on the comparison, the participant and/or participant device may be determined based on a match of a multimedia signature to a known multimedia signature. In one embodiment, the participant module 205 determines an origin of the information used in effecting device events. By way of example, for an audio call, the participant module 205 may determine the caller and the callee of the audio communication. Based on the caller and the callee, the participant module 205 can determine the participants and/or the participant devices based on, for example, telephone numbers, device identifiers, or the like associated with the caller and the callee. For one or more textual communications, such as an instant message conversation, the participant module 205 may determine the participants and/or the participant devices based on the user nicknames associated with the instant message conversation and the IP addresses associated with the user nicknames. The participant module 205 may also determine the participant and/or participant devices associated with a device event based on one or more communication logs associated with the UE 101 associated with the device events, or based on one or more personal information management user interfaces.

Based on the participants and/or participant devices determined by the participant module 205, in conjunction with the multimedia signatures determined by the signature module 203, the participant module 205 causes an association of one or more multimedia signatures with the one or more device events, the one or more participants, and/or the one or more participant devices. By way of example, the participant module 205 determines the origin of the participant associated with a device event and an origin of a multimedia signature associated with participant determined based on the signature module 203.

In one embodiment, the participant module 205 determines that one or more participants or participant devices associated with a device event are unknown. By way of example, a participant associated with an audio call with the UE 101 may be determined as being unknown based on, for example, the participant not appearing in a log associated with the UE 101 (e.g., contacts list). Despite the participant being unknown for not matching a known participant or participant device associated with a log of the UE 101, the participant module 205 may still associate a multimedia signature determined by the signature module 203 with the unknown participant. Thus, a user of the UE 101 may associate the multimedia signature with the unknown participant for later identification or to remember characteristics of the unknown participant that may later be used to identify the unknown participant.

The user interface (UI) module 207 may interact with one or more applications running on the UE 101 to provide identification based on a multimedia signature and may also provide identification of the subject or content of one or more device events based on the conversation signature. The UI module 207 may render one or more user interfaces for presenting the device events, the participants, and/or the participant devices based on the multimedia signatures. The UI module 207 may also determine an input at the UE 101 for selecting a device event, a participant, a participant device, or a combination thereof and present a multimedia signature associated with the selected device event, participant, participant device, or the combination thereof. The UI module 207 may present one or more user interfaces corresponding to, for example, a communication log user interface and a personal information management user interface.

Figure 3:
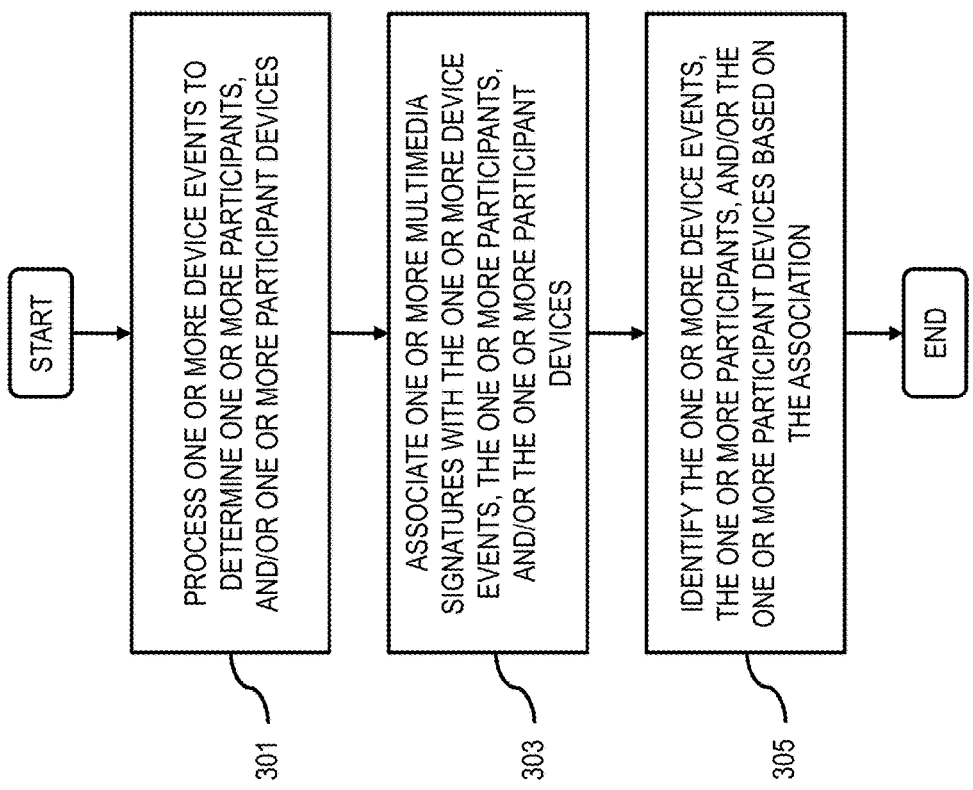
FIG. 3 is a flowchart of a process for providing identification based on a multimedia signature, according to one embodiment.
Figure 9:
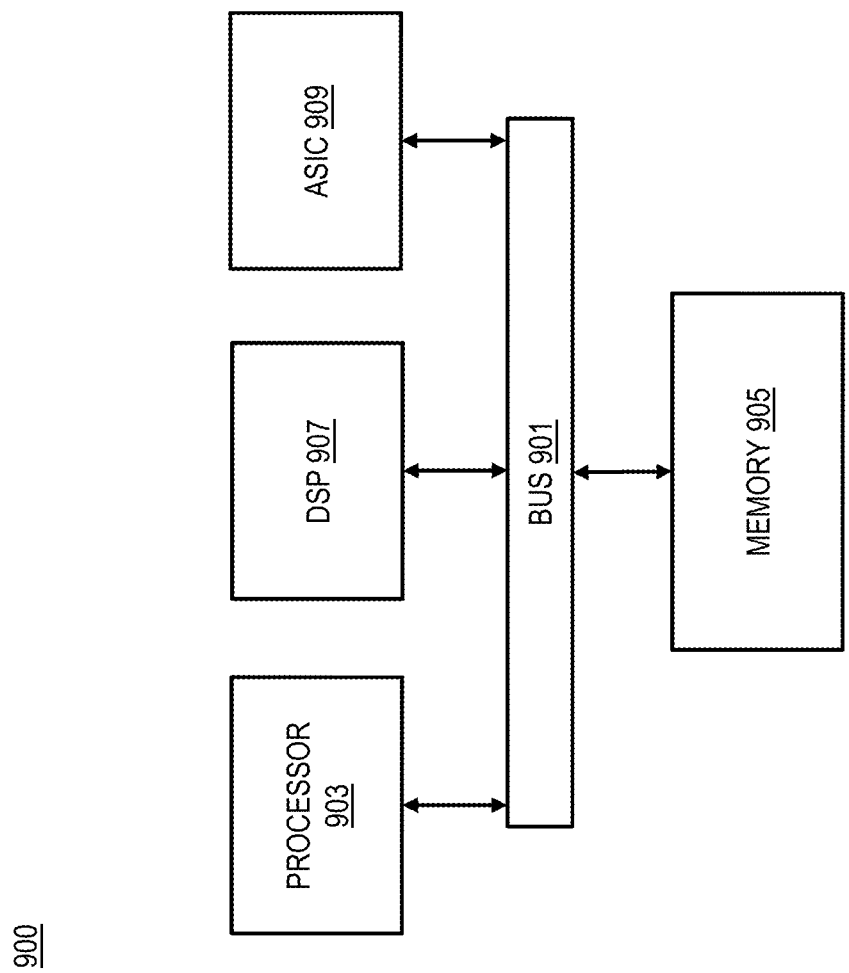
FIG. 9 is a diagram of a chip set that can be used to implement an embodiment of the invention.

FIG. 3 is a flowchart of a process 300 for providing identification based on a multimedia signature, according to one embodiment. In one embodiment, the identification platform 103 performs the process 300 and is implemented in, for instance, a chip set including a processor and a memory as shown in FIG. 9. In step 301, the identification platform 103 processes one or more device events to determine one or more participants and/or one or more participant devices. In one embodiment, the identification platform 103 may determine the participants and the participant devices based on processing one or more logs associated with the device events. By way of example, a device event may be associated with a log that includes the participant devices associated with an audio call, a video call, or a combination thereof associated with a UE 101. For example, the UE 101 will include information regarding the phone number and/or contact name associated with an incoming audio call. If the UE 101 does not recognize the number, because, for example, a contact is not saved on the UE 101 that is associated with the number, the log may merely identify the audio call as unknown. The identification platform 103 still identifies the participant, but merely identifies the participant as unknown. In another example, the log may correspond to a log that includes the participants associated with an instant message communication. For example, a service 109 associated with the instant message communication may include user names associated with the participants. The identification platform 103 may determine the participants based on the logs associated with the instant message communication, either based on logs saved at the UE 101 or on logs saved at the service provider of the instant message communication. Further, by way of example, a social networking service 109 associated with a social networking website may include user nicknames associated with a device event, such as a post on the social networking website.

In one embodiment, the identification platform 103 may identify the participants and/or participant devices actively, by monitoring packets and/or signals received and transmitted at the UE 101, and determine the origins of the packets and/signals. By way of example, for instant message communications, the identification platform 103 may monitor IP address of the users that are associated with the instant message communication. Based on the IP address, the identification platform 103 may identity a participant and/or a participant device. The identification platform 103 may similarly determine the participants and/or participant devices to an email communication based on the email addresses or IP numbers associated with the email.

In step 303, the identification platform 103 causes an association of one or more multimedia signatures with the one or more device events, the one or more participants, and/or the one or more participant devices. The multimedia signatures may have been already generated by the identification platform 103, may be currently being generated by the identification platform 103, or may be transmitted with a device event, such as when a participant and/or a participant device generates a their own multimedia signature for other participants and/or participant devices to use for identification. By way of example, during a device event, such as an audio call, the identification platform 103 may generate a multimedia signature by, for example, recording a snippet of the audio call and determining that the participant talking during the snippet is a participant and/or associated with a participant device. Accordingly, the identification platform 103 associates the generated multimedia signature with the participant and/or the participant device. In one embodiment, at step 303, the identification platform 103 also associates one or more conversation signatures with the device events, the participants, and/or the participant devices. As discussed above, the conversation signatures may identify the subject and/or content of one or more devices events, such as one or more communication sessions, one or more calendar reminders, one or more instant message communications, and the like.

In step 305, the identification platform 103 identifies the one or more device events, the one or more participants, and/or the one or more participant devices based on the association. Upon determining a device event, a participant, and/or a participant device, and associating a multimedia signature with the device event, the participant, and/or the participant device, the identification platform 103 may subsequently identify the device event, the participant, and/or the participant device in any setting, such as in various applications executed at the UE 101, based on the association. By way of example, a participant to an audio call may be indentified during the audio call. Further, a multimedia signature may be generated during the audio call and associated with the participant. Accordingly, in whatever application the participant is associated with, the identification platform 103 may identify the participant based on the multimedia signature. Thus, for example, the multimedia signature may be used to identify the participant when participant is displayed in a contacts list, or when the audio call associated with the participant is displayed in a call log, or when a calendar reminder is displayed at the UE 101 that is associated with the participant. Thus, by having a multimedia signature played upon selecting the participant in any context of any application, the user of the UE 101 can quickly identify the participant by, for example, hearing the user's voice being played by the multimedia signature.

In one embodiment, at step 305, the identification platform 103 may also identify one or more conversation signatures associated with the device events, the participants, and/or the participant devices. By way of example, upon identifying a participant and device event based on a multimedia signature, the identification platform 103 also may identify a conversation signature that is based on the subject and/or content of device event. Thus, the user of the UE 101 that is receiving the signatures may determine the device, participant, and/or participant device based on the multimedia signature, and the content associated with the, for example, device event based on the conversation signature. After step 305, the process ends.

Figure 4:
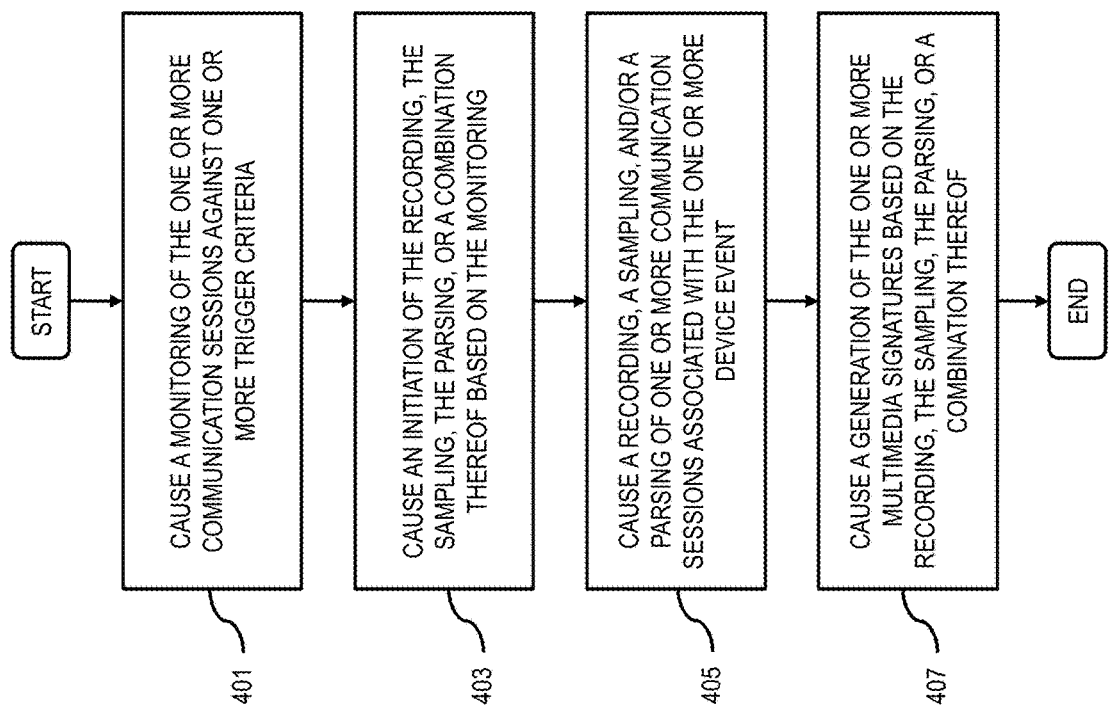
FIG. 4 is a flowchart of a process for generating a multimedia signature, according to one embodiment.

FIG. 4 is a flowchart of a process 400 for generating a multimedia signature, according to one embodiment. In one embodiment, the identification platform 103 performs the process 400 and is implemented in, for instance, a chip set including a processor and a memory as shown in FIG. 9. In step 401, the identification platform 103 causes a monitoring of one or more communication sessions against one or more trigger criteria. Thus, in one embodiment, when a communication session begins, the identification platform 103 begins monitoring for a triggering of one or more criteria. In one embodiment, one or more applications 111 associated with the communication session may initiate the identification platform 103 monitoring the communication sessions. In one embodiment, one or more communications may go through the identification platform 103 prior to reaching the intended UE 101 of the communication session. In which case, the identification platform 103 may begin monitoring the communication sessions prior to the communication session beginning at the UE 101.

In step 403, the identification platform 103 causes an initiation of a recording, a sampling, and/or a parsing based on the monitoring. The initiation may be based on the monitoring indicating the one or more of the trigger criteria are satisfied. By way of example, one trigger criteria may be based on temporal information, such that as soon as the communication session becomes active, the identification platform 103 initiates the recording, sampling, and/or parsing of the communication session. By way of example, one trigger criteria may be based on volume information, such that when the volume associated with a communication sessions exceeds a certain threshold, the initiation of the recording and/or sampling and/or parsing of the communication session begins. For example, for communication sessions that include audio, participant of the communication sessions often express important snippets of the communication session at a higher volume and/or pitch that when regularly communicating. By having the volume and/or pitch of the audio associated with the communication session be a trigger of the recording and/or sampling, the identification platform 103 can record only important snippets that may allow quick identification of the participant.

In step 405, the identification platform 103 causes the recording, the sampling, the parsing, or the combination thereof of the communication session associated with the device event. By way of example, for a communication session associated with audio, the identification platform 103 begins recording the communication session. By way of example, for a communication session associated with video, the identification platform 103 begins sampling the communication session. By way of example, for a communication session associated with text, the identification platform 103 begins parsing the communication session. The recording, the sampling, and/or the parsing of the communications may stop when the trigger that initiated the recording, sampling, and/or parsing is not longer satisfied (e.g., when a temporal period has expired), or when another trigger is satisfied.

In step 407, the identification platform 103 causes a generation of one or more multimedia signatures based on the recording, the sampling, the parsing, or the combination thereof. The identification platform 103 may process the recording, sampling, and/or parsing to determine the various participants within recording, sampling, and/or parsing based on, for example, one or more algorithms analyzing differences in the communications. The identification platform 103 also may accept input from a user of a UE 101 associated with the recording, sampling, and/or parsing to crop the recording, sampling, and/or parsing based on the participants within the communications. By way of example, a user may manually crop a recording of an audio communication to determine the various participants within the communication. By way of another example, a user may manually select portions of text from, for example, an email to use as the multimedia signature. After the recording, sampling, and/or parsing and the subsequent processing, the identification platform 103 generates one or more signatures for the one or more participants in the communications.

In one embodiment, at step 407, the identification platform 103 also may generate one or more conversation signatures associated with the communication sessions. The conversation signatures may be generated automatically or based on one or more manual user inputs. The automatic generation of the conversation signature may be based on one or more algorithms. The one or more algorithms may be based on, for example, certain keywords that are determined to generally relate to the subject and/or the content of the communication sessions. The algorithms may also be based on, for example, the volume or pitch associated with audio and/or video communication sessions. For example, important words or phrases may sometimes be communicated at different levels of volume and/or pitch. In one embodiment, the user associated with generating a conversation signature may manually generate the conversation signature based on selecting, for example, one or more snippets of audio, video, and/or textual communications. Thus, by the user determining the conversation signature, the user has more control over what the conversation signature covers.

Figure 5:
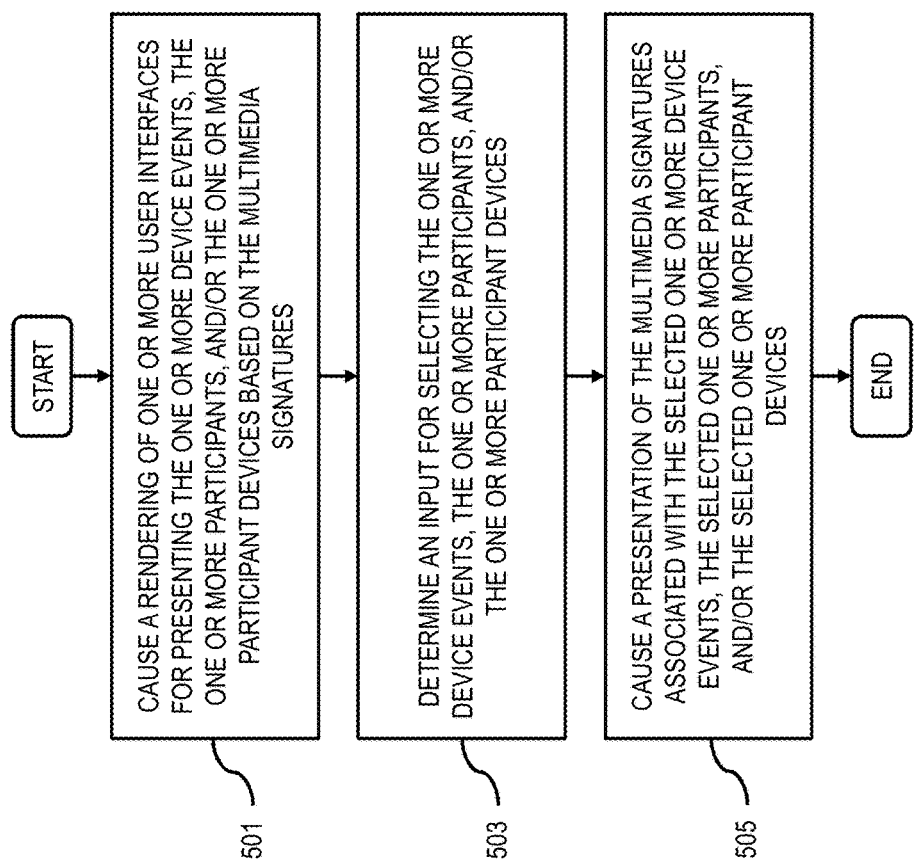
FIG. 5 is a flowchart of a process for determining a device event, a participant, and/or a participant device to provide identification, according to one embodiment.

FIG. 5 is a flowchart of a process 500 for determining a device event, a participant, and/or a participant device to provide identification, according to one embodiment. In one embodiment, the identification platform 103 performs the process 500 and is implemented in, for instance, a chip set including a processor and a memory as shown in FIG. 9. In step 501, the identification platform 103 causes a rendering of one or more user interfaces for presenting the one or more device events, the one or more participants, and/or the one or more participant devices based on the multimedia signatures. The user interfaces may include, for example, one or more communication log user interfaces, one or more personal information management user interfaces, or a combination thereof. By way of example, a communication log user interface may correspond to a user interface associated with a log of audio calls, a log of text messages, a log of instant message communications, and the like. The device events, the participants, and/or the participant devices may correspond to audio and/or video calls, the participants of the audio and/or video calls, and the participant devices used by the participants of the audio and/or video calls. Thus, for example, the communication log may include that participant A called the UE 101 at a certain time using a certain device. A personal information management user interface may correspond to a user interface associated with a calendar, a daily planner, a notes application, and the like. The device events may be reminders for certain events in the calendar and/or the daily planner.

In step 503, the identification platform 103 determines an input for selecting one or more device events, one or more participants, and/or one or more participant devices. By way of example, an input at a UE 101 may select a device event, such as an incoming telephone call associated with an unknown number in a call log. By way of a further example, an input at the UE 101 may select a contact within a list of contacts associated with a social networking service. The input may be effected by any means, such as a tactile input, a visual input, and/or a verbal input.

In step 505, the identification platform 103 causes a presentation of the multimedia signatures associated with the selected one or more device events, the selected one or more participants, and/or the selected one or more participant devices. By presenting the multimedia signature, the user of the UE 101 that is rendering the user interface may determine the device event, the participant and/or the participant device based on the multimedia signature without having to, for example, read the information contained in the user interface (e.g., for an audio and/or video multimedia signature) or without having to read a long message contained in the user interface (e.g., for a textual multimedia signature). By way of example with respect to an unknown participant within a call log, the identification platform 103 presents a multimedia signature that identifies the participant associated with the device event by the user of the UE 101 recognizing the voice of the participant without the user having to read and understand the visual aspects of the call log user interface.

In one embodiment, at step 505, the identification platform 103 also causes a presentation of one or more conversation signatures associated with the selected device events, participants, and/or participant devices. By way of example, a device event, such as a calendar reminder, may be presented to a user associated with a UE 101 through a user interface at the UE 101. The conversation signature may indicate the subject of the device event, such as the subject of the calendar reminder. Thus, for example, when a calendar reminder appears on a user interface associated with a UE 101, rather than the user of the UE 101 relying on reading the user interface to determine the identity of the device event, participant associated with the device event, and/the participant device associated with the device event, the indication platform 103 may identify the foregoing based on the multimedia signature by playing an audio recording that identifies the foregoing. The identification platform 103 may also identify the subject and/or content of the calendar reminder based on the conversation signature associated with the calendar reminder by including an audio recording that identifies the subject. After step 505, the process 500 ends.

Figure 6:
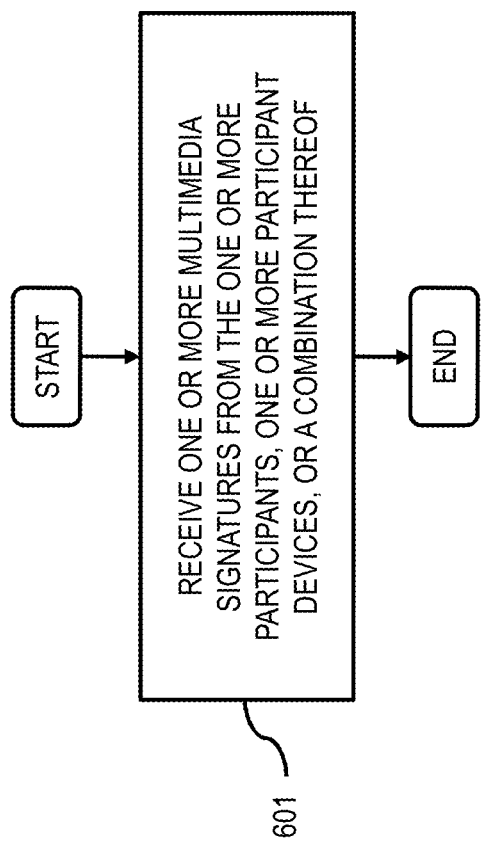
FIG. 6 is a flowchart of a process for receiving one or more multimedia signatures, according to one embodiment.

FIG. 6 is a flowchart of a process 600 for receiving one or more multimedia signatures, according to one embodiment. In one embodiment, the identification platform 103 performs the process 600 and is implemented in, for instance, a chip set including a processor and a memory as shown in FIG. 9. In step 601, the identification platform 103 receives one or more multimedia signatures from one or more participants, one or more participant devices, or a combination thereof. By way of example, a user associated with a UE 101 may generate one or more multimedia signatures that distinguish them as a participant or their device as a participant device. The user may, for example, generate one or more audio signatures, one or more video signatures, and/or one or more textual signatures. The audio signatures may be created by the user talking into a microphone, the video signatures may be created by the user using a video camera associated with a UE 101, or textual signature may be created by the user entering in one or more textual phrases. The user may then transmit the multimedia signatures to the identification platform 103 that will subsequently identify the user that created the multimedia signature based on the multimedia signature when the user is a participant and/or the user's UE 101 is the participant device associated with an action for identification. Thus, a user may control the multimedia signature that is used by the identification platform 103 to distinguish the user or the UE 101 associated with the user from other participants and/or other participants.

Figure 7A:
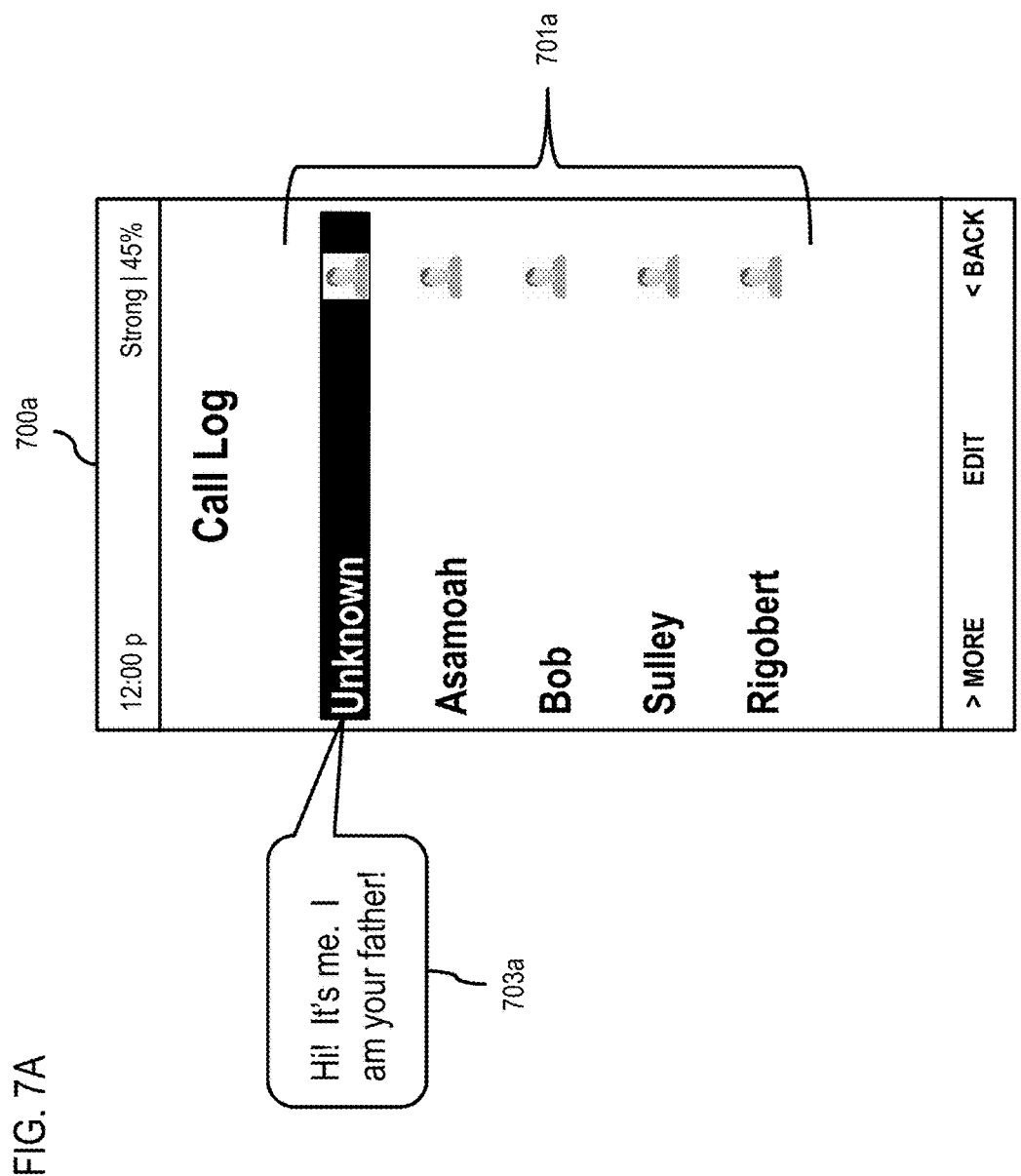
FIGS. 7A-7E are diagrams of user interfaces utilized in the processes of FIGS. 3-6, according to various embodiments.

FIGS. 7A-7E are diagrams of user interfaces utilized in the processes of FIGS. 3-6, according to various embodiments. FIG. 7A illustrates a user interface 700a associated with a call log 701a that lists five calls that were conducted using the UE 101. The individual entries in the call log 701a represent participants that the user of the UE 101 has previously communicated with, including one participant that is unknown. The participant may be unknown because, for example, the participant and/or the participant device is not associated with an entry in a contacts list associated with the UE 101. However, based on one or more communications between the unknown participant and the UE 101, a multimedia signature 703a was generated by the identification platform 103. The multimedia signature 703a may represent an audio signature that identifies the unknown participant based on the voice of the recipient. By way of example, the audio signature is of the participant speaking, "Hi! It's me. I am your father." Thus, although the participant appears as unknown in the call log 701a, the user of the UE 101 may identify the participant based on the identification platform 103 generating a multimedia signature associated with the device event (e.g., the audio call), the participant (e.g., the caller), and/or the participant device (e.g., the device associated with the phone number). A user may subsequently select the other five calls that are in the call log 701a for additional multimedia signatures associated with the other device events (e.g., calls).

Figure 7B:
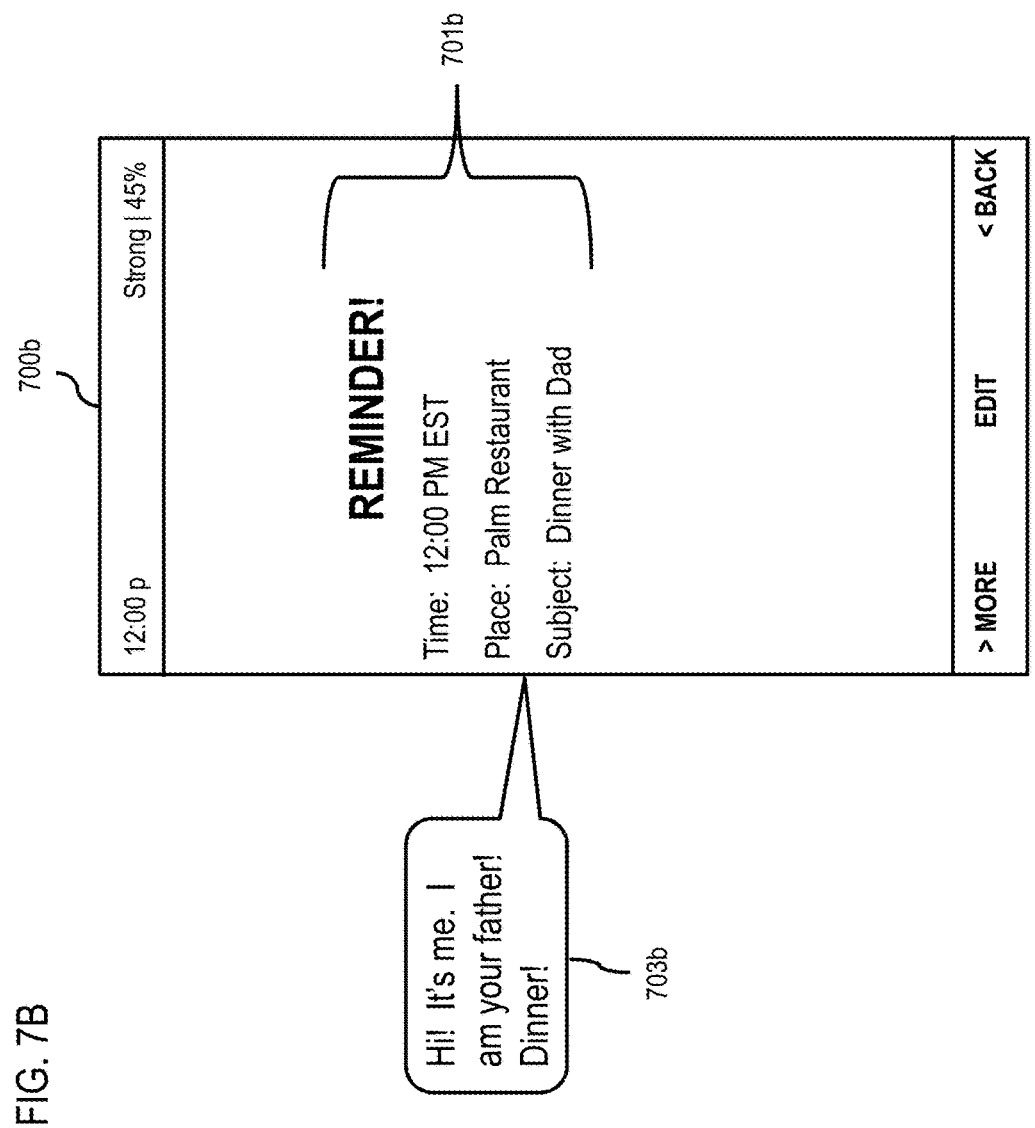

FIG. 7B illustrates a user interface 700b associated with a device event 701b, such as a calendar reminder, that is identified using a multimedia signature 703b. Here, the multimedia signature 703b may represent, for example, an audio signature of one or more audio recordings of the father of the user of the UE 101. Based on the multimedia signature 703b, the multimedia signature identifies the father of the user of the UE 101 is a participant of the calendar reminder. For example, in the illustration of FIG. 7B, the multimedia signature 703b represents an audio recording of the father speaking, "Hi! It's me. I am your father!" In one embodiment, the multimedia signature may be combined with conversation signature. For example, in the illustrate of FIG. 7B, the multimedia signature 703b includes the conversation signature of "Dinner!" Thus, based on the audio recording associated of the conversation signature, the user associated with the UE 101 may also identify that the subject of the calendar reminder is dinner based on the audio recording and not based on reading the user interface 700b. In one embodiment, the multimedia signature automatically plays when the reminder appears on the UE 101. In one embodiment, the multimedia signature may play when the user of the UE 101 selects for the multimedia signature to play.

Figure 7C:
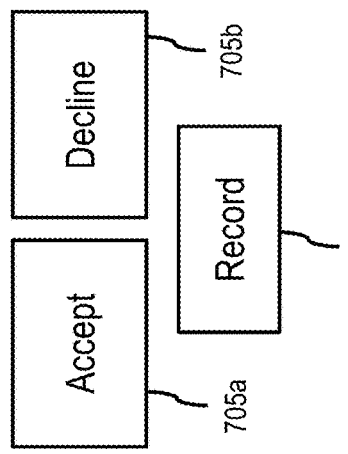

FIG. 7C illustrates a user interface 700c associated with a device event, such as an incoming call. The user interface 700c includes indicators 705a and 705b that allow the user of the UE 101 to either accept the call or decline the call. Further, indicator 705c allows the user of the UE 101 to modify, for example, the trigger criteria associated with the identification platform 103 for initiating, for example, a recording or a sampling of the incoming call. If the user of the UE 101 selects indicator 705a, the call proceeds as normal and a multimedia signature is not generated based on the call. However, if the user of the UE 101 selects the indicator 705c, the UE 101 may interface with the identification platform 103 to create a multimedia signature based on the communication session associated with the call.

Figure 7D:
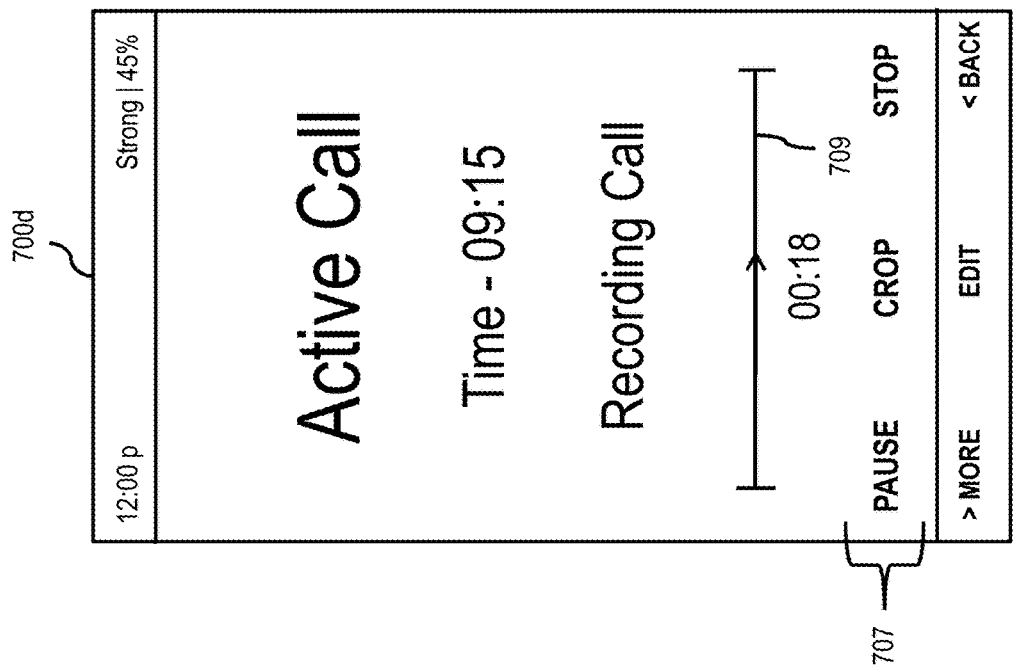

FIG. 7D illustrates a user interface 700d associated with a UE 101 where a device event, such as an incoming call, is being recorded to generate one or more multimedia signatures. The three indicators 707 and the timeline indicator 709 allow a user to modify the recording. By way of example, the user may modify the recording by selecting only snippets of the call where the person (or persons) on the other end of the call are speaking. Accordingly, the user associated with the UE 101 may modify the recording to constitute a multimedia signature that will help the user to remember the participant(s) and/or participant device(s) associated with the call.

Figure 7E:
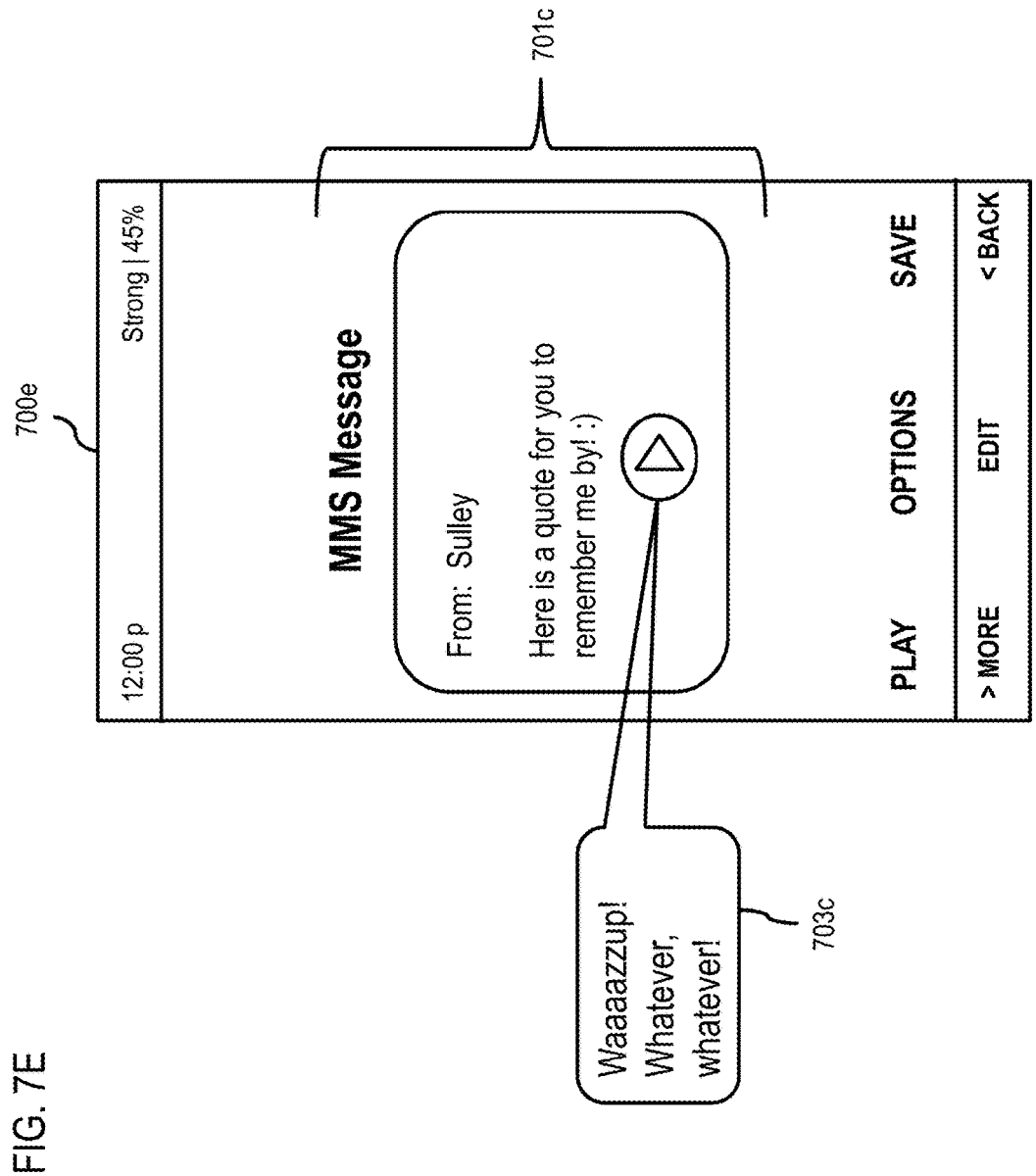

FIG. 7E illustrates a user interface 700e associated with a UE 101 that received a device event 701c, such as an MMS message. The MMS message may include a multimedia signature 703c that the another user, created, associated with the MMS and sent to the user of the UE 101 so that the user of the UE 101 may use the multimedia signature 703c to identify device events associated with the participant and/or the participant device, may identify the participant, and/or the participant device.

The processes described herein for providing identification based on a multimedia signature may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
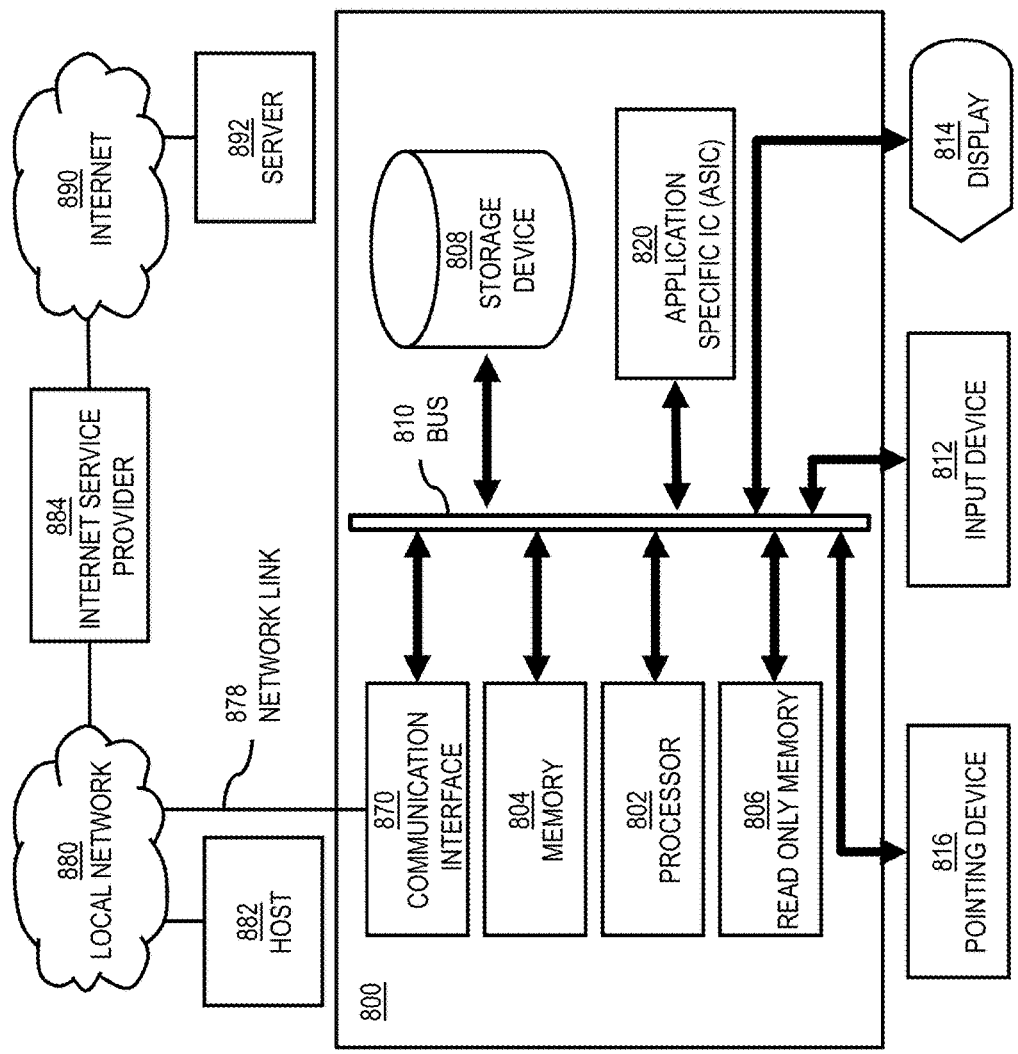
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide identification based on a multimedia signature as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing identification based on a multimedia signature.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing identification based on a multimedia signature. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing identification based on a multimedia signature. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing identification based on a multimedia signature, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing identification based on a multimedia signature to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide identification based on a multimedia signature as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing identification based on a multimedia signature.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide identification based on a multimedia signature. The memory 905 also stores the data associated with or generated by the execution of the inventive steps.

Figure 10:
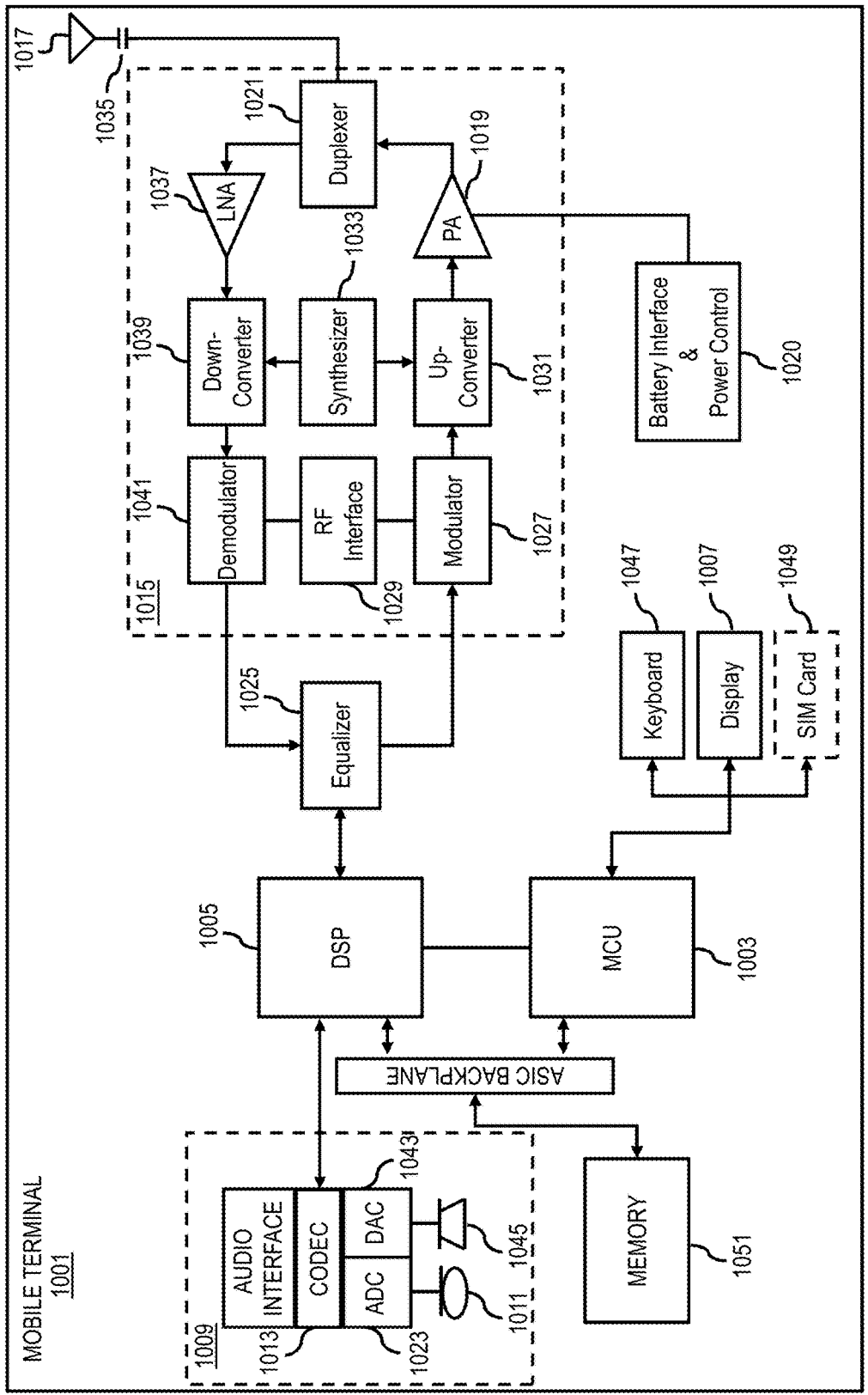
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing identification based on a multimedia signature. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing identification based on a multimedia signature. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide identification based on a multimedia signature. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The invention claimed is:

1. A method for providing identification based on a multimedia signature, the method comprising:
    monitoring one or more communication sessions against one or more trigger criteria,
        wherein the one or more communication sessions involve one or more external participants, one or more external participant devices associated with the one or more external participants or a combination thereof,
        wherein the one or more trigger criteria are configured to help identify a person speaking in an audio recording of at least one of the one or more external participants;
    determining, utilizing at least one processor, one or more triggers in the communication session based on the monitoring and the one or more trigger criteria;
    initiating a recording of at least a part of the communication session based, at least in part, on at least one of the determined one or more triggers originating from the one or more external participants;
    recording of at least an incoming portion of the communication session, the recording including the at least one of the determined one or more triggers originating from the one or more external participants, based on the initiating,
    generating the multimedia signature by associating a record of the recording with the one or more external participants, the one or more external participant devices or the combination thereof;
    processing of one or more incoming user device events at a user device,
        wherein the one or more incoming user device events result from a communication originating from the one or more external participants, the one or more external participant devices, or a combination thereof,
        wherein the one or more incoming user device events are one or more audio calls, video calls, MMS messages, SMS messages, emails, comments on a social networking service, calendar events, task events or a combination thereof; and
    associating the generated multimedia signature with the one or more processed incoming user device events in a user interface of the user device.

2. A method of claim 1, wherein the one or more participants, the one or more participant devices, or the combination thereof are unknown at initiation of the processing of the one or more incoming user device events at the user device.

3. A method of claim 1, wherein the one or more trigger criteria include, at least in part, a keyword recognition, temporal information, volume information, pitch information, or a combination thereof.

4. A method of claim 1, further comprising:
    rendering of one or more user interfaces for presenting the one or more user device events, the one or more participants, the one or more participant devices, or the combination thereof based, at least in part, on the one or more multimedia signatures.

5. A method of claim 4, further comprising:
    selecting the one or more user device events, the one or more participants, the one or more participant devices, or the combination thereof; and
    presenting of the one or more multimedia signatures associated with the selected one or more participants, the selected one or more participant devices, or the combination thereof.

6. A method of claim 4, wherein the one or more user interfaces include, at least in part, one or more communication log user interfaces, one or more personal information management user interfaces, or a combination thereof.

7. A method of claim 1, further comprising:
    receiving the one or more multimedia signatures from the one or more participants, the one or more participant devices, or the combination thereof.

8. A method of claim 1, further comprising:
    generating one or more conversation signatures based on one or more device events, wherein the generated one or more conversation signatures identify subject matter of respective device events of the one or more device events.

9. A method of claim 8, further comprising:
    processing the one or more device events to generate the one or more conversation signatures, incorporating at least some part of a device event into a generated conversation signature of the one or more generated conversation signatures, associating one or more time dimensions with the generated one or more conversation signatures, or a combination thereof.

10. A method of claim 9, further comprising:
    associating one or more multimedia signatures with the one or more generated conversation signatures, wherein the associated one or more multimedia signatures are linked to one or more participants of respective device events of the one or more device events.

11. An apparatus for providing identification based on a multimedia signature, the apparatus comprising:
at least one processor; and
at least one memory including computer program code for one or more programs,
the at least one memory and the computer program code configured to, with the at least one processor, cause the apparatus to perform at least the following,
monitor one or more communication sessions against one or more trigger criteria,
wherein the one or more communication sessions involve one or more external participants, one or more external participant devices associated with the one or more external participants or a combination thereof,
wherein the one or more trigger criteria are configured to help identify a person speaking in an audio recording of at least one of the one or more external participants;
determine one or more triggers in the communication session based on the monitoring and the one or more trigger criteria;
initiate a recording of at least a part of the communication session based, at least in part, on at least one of the determined one or more triggers originating from the one or more external participants,
cause, at least in part, a recording of at least an incoming portion of the communication session, the recording including the at least one of the determined one or more triggers originating from the one or more external participants, based on the initiating,
cause, at least in part, a generation of the multimedia signature by associating a record of the recording with the one or more external participants, the one or more external participant devices or the combination thereof,
process and/or facilitate a processing of one or more incoming user device events at the apparatus,
wherein the one or more incoming user device events result from a communication originating from the one or more external participants, the one or more external participant devices, or a combination thereof,
wherein the one or more incoming user device events are one or more audio calls, video calls, MIMS messages, SMS messages, emails, comments on a social networking service, calendar events, task events or a combination thereof, and
cause, at least in part, an association of the generated multimedia signature with the one or more processed incoming user device events in a user interface of the apparatus.

12. An apparatus of claim 11, wherein the one or more participants, the one or more participant devices, or the combination thereof are unknown at initiation of the processing of the one or more incoming user device events at the user device.

13. An apparatus of claim 11, wherein the one or more trigger criteria include, at least in part, a keyword recognition, temporal information, volume information, pitch information, or a combination thereof.

14. An apparatus of claim 11, wherein the apparatus is further caused to:
cause, at least in part, a rendering of one or more user interfaces for presenting the one or more user device events, the one or more participants, the one or more participant devices, or the combination thereof based, at least in part, on the one or more multimedia signatures.

15. An apparatus of claim 14, wherein the apparatus is further caused to:
determine an input for selecting the one or more user device events, the one or more participants, the one or more participant devices, or the combination thereof, and
cause, at least in part, a presentation of the one or more multimedia signatures associated with the selected one or more participants, the selected one or more participant devices, or the combination thereof.

16. An apparatus of claim 14, wherein the one or more user interfaces include, at least in part, one or more communication log user interfaces, one or more personal information management user interfaces, or a combination thereof.

17. An apparatus of claim 11, wherein the apparatus is further caused to:
receive the one or more multimedia signatures from the one or more participants, the one or more participant devices, or the combination thereof.

18. An apparatus of claim 11, wherein the apparatus is further caused to:
generate one or more conversation signatures based on one or more device events, wherein the generated one or more conversation signatures identify subject matter of respective device events of the one or more device events.

19. An apparatus of claim 18, wherein the apparatus is further caused to:
process the one or more device events to generate the one or more conversation signatures, incorporate at least some part of a device event into a generated conversation signature of the one or more generated conversation signatures, associate one or more time dimensions with the generated one or more conversation signatures, or a combination thereof.

20. An apparatus of claim 19, wherein the apparatus is further caused to:
associate one or more multimedia signatures with the one or more generated conversation signatures, wherein the associated one or more multimedia signatures are linked to one or more participants of respective device events of the one or more device events.

* * * * *